United States Patent Office 3,076,716
Patented Feb. 5, 1963

3,076,716
PRODUCTION OF GRANULAR ZIRCONIA PRODUCTS
Augustus Jeremiah Hathaway III, Niagara Falls, N.Y., assignor to National Lead Company, New York, N.Y., a corporation of New Jersey
No Drawing. Filed Dec. 31, 1959, Ser. No. 863,192
10 Claims. (Cl. 106—57)

This invention relates to a novel process for making granular, low-silica, zirconium oxide products.

Prior to the present invention granular zirconia products have been produced by crushing and/or milling large lumps of fused zirconium oxide. Not only is this milling expensive in itself because of the hardness of the zirconia, but considerable iron, an undesirable impurity, is picked up from the crushing and milling equipment and removal of such iron is troublesome and also expensive.

It is, therefore, an object of the present invention to provide a method for producing low-silica, zirconia grain or powder directly from zircon or other zirconia ore.

Another object of the present invention is to provide a process for making low-silica, zirconia grain or powder without the need for primary crushing.

A further object of the present invention is to make granular, low-silica, stabilized zirconium oxide products directly from a zirconia ore.

Other objects and advantages of the present invention will be apparent from the following description thereof.

The process of the present invention comprises, broadly, the arc furnacing of a mixture of zircon or other silica-containing zirconium ore, carbon, and an alkaline earth metal oxide at a temperatuer in excess of about 4500° F. to produce a pig of fused, complex reduced zirconium product which is thereafter subjected while hot to oxidizing conditions whereby there is produced a granular, fused zirconia product which has a low silica content. A "low-silica" product for the purpose of the present application is a product in which the silicon content when calculated as $SiO_2$ is not in excess of about 1.5%. For some purposes zirconia with a silica content above this level is not satisfactory.

Although the reactions involved in carrying out the process of the present invention are not fully understood and the fused product obtained by the arc-furnacing step is of complex and indefinite composition which varies with the furnace mix employed and furnacing conditions, it is believed that the process proceeds as follows:

In the arc furnace any zirconium silicate in the charge is dissociated at furnace temperatures into zirconia ($ZrO_2$) and silica ($SiO_2$). Thereupon, most of the silica present, including that resulting from such decomposition, is reduced by a part of the carbon in the furnace charge or by carbon monoxide formed in the furnace to the much more volatile compound SiO, and is then volatilized. At the same time, a small portion of the zirconia is reduced by carbon or carbon monoxide to a complex product, usually called zirconium cyanonitride. Zirconium cyanonitride, so called, has been found by analysis to contain zirconium, carbon, nitrogen, and oxygen. It is, however, of varying composition and the exact manner in which these elements are combined has not been satisfactorily determined. In any event, when the molten mass in the furnace solidifies, the remainder of the zirconia forms grains or crystals and these, together with the alkaline earth metal oxides, silica and other impurities remaining, are intimately mixed with the zirconium cyanonitride as a hard, relatively dense mass which is referred to in the present specification and claims as a "complex reduced zirconium product."

When the hard, complex reduced zirconium product is subjected to an oxidizing atmosphere while hot the zirconium cyanonitride therein is oxidized and the mass thereupon disintegrates, freeing the grains or crystals of zirconia. The exact function of the alkaline earth metal oxides in the process as described above is not known except that, of course, if sufficient lime and/or magnesia is present the zirconia present in the mass is to some extent stabilized. However, even in cases where no significant stabilization of the zirconia is obtained, a granular, low-silica, zirconia product results when the mass is oxidized. The particle size and particle size distribution of such granular products varies, apparently as a result of differences in the zirconium cyanonitride content of the pigs and its distribution therein. It has been found, however, that a majority of the particles of such products will pass a 4 mesh sieve and be held on a 100 mesh sieve.

It is, of course, well known that certain alkaline earth metal oxides, the oxides of magnesium and calcium, have the effect of stabilizing zirconia, i.e. converting its crystal form from monoclinic to cubic. It has not, however, been previously known that those oxides, even in such small quantities as to produce no significant stabilization of the zirconia, as well as the oxides of the other alkaline earth metals, barium and strontium, arc-furnaced with a mixture of zirconia ore and carbon in accordance with the present invention will give a fused, complex, reduced zirconium product which disintegrates under hot oxidizing condition to form a granular, low-silica zirconia product. The degree of stabilization, if any, of the last-mentioned product will depend upon the amount of magnesium oxide and/or calcium oxide remaining in the product.

The following examples illustrate the operation of the process of the present invention. In Example 1 a preferred method of carrying out the process in producing a granular, low-silica, unstabilized zirconia product is described.

*Example 1*

A mix formed from 10,000 pounds of zircon sand, 1200 pounds of petroleum coke, and 400 pounds of magnesium oxide is charged to a single electrode arc furnace of conventional type operating at 50 volts and 15,000 amperes in order to produce a temperature in excess of 4500° F. After starting the furnace with a portion of the mix packed around the electrode, the rest of the mix is added to the furnace at intervals over a period of about 35 hours. The fused, complex reduced zirconium product resulting from the fusion is cooled in the furnace shell and the pig thus formed is removed. This pig is hand cleaned to remove unreacted and semi-reacted material and is then placed in an oil-fired muffle furnace. The pig is calcined in the muffle furnace with an oxidizing atmosphere at a temperature of about 2200° F. to produce the desired granular zirconia which is essentially unstabilized and has an average silica content of about 0.5%.

In the following example a preferred method is described for carrying out the present novel process in producing a granular, low-silica, zirconia product having a high degree of stabilization.

*Example 2*

A mixture of 10,000 pounds of zircon sand, 1200 pounds of petroleum coke, and 1640 pounds of ground limestone is charged to a furnace like that described in Example 1, using the same procedure there described. The fused, complex reduced zirconium product obtained is cooled in the furnace shell. The resultant pig is hand cleaned and is then placed in an oil-fired muffle furnace heated to 2200° F. and calcined in an oxidizing atmosphere to produce by disintegration the desired granular, stabilized zirconia. The product, after cooling, is a yellowish-white, granular, low-silica zirconia containing an average of about 0.4% silica.

The following example illustrates the use of other furnace mixes in producing granular, low-silica, unstabilized, zirconia products according to the present invention.

*Example 3*

A mixture of 10,000 pounds of zircon sand, 1200 pounds of petroleum coke and 400 pounds of ground limestone is used as a charge for a conventional, single electrode arc furnace of the type described above. Using the same procedure as described in Example 1 there is obtained a pig of a fused, complex reduced zirconium product that, after cleaning and calcination in the manner described in Example 1 gives an essentially unstabilized, granular, low-silica zirconia.

Other examples describing the preparation by the novel process of the present invention of granular, low-silica, zirconia products of different degrees of stabilization are given below.

*Example 4*

A mixture of 9000 pounds of zircon sand, 740 pounds of petroleum coke, and 740 pounds of ground limestone is fed to a single electrode arc furnace of conventional type. Using the same procedure as described in Example 1 a fused pig of a complex reduced zirconium product is produced which after cleaning is calcined as described in Example 1. On disintegration it yields a granular, low-silica, stabilized zirconia product.

*Example 5*

A mix consisting of approximately 8200 pounds of zircon sand, 980 pounds of petroleum coke, and 820 pounds of calcium oxide is furnaced in the same way as described in Example 1 and the resulting pig of fused complex reduced zirconium product is, after cleaning, calcined as therein described to obtain a granular, stabilized zirconia having a low-silica content.

*Example 6*

A mix made of 9000 pounds of zircon sand, 800 pounds of coke, and 800 pounds of magnesium oxide is used as a charge for a single electrode arc furnace of conventional type operating at 50 volts and 15,000 amperes. Following the procedure of Example 1 there is obtained a fused pig of complex reduced zirconium product. This pig is cooled in the furnace and, after cleaning, is placed in a muffle furnace and calcined at about 1500° F. in an oxidizing atmosphere to produce a granular, low-silica, stabilized zirconia product.

As indicated above, silica-containing zirconia ores other than zircon may be used in carrying out the present invention. In the following example the use of a baddeleyite, a type of zirconium ore which typically may contain 75%–90% $ZrO_2$, up to about 20% silica, and up to about 10% of other oxides, is illustrated.

*Example 7*

A mix consisting of 9000 pounds of granular baddeleyite, 450 pounds of petroleum coke, and 1600 pounds of ground limestone is furnaced in the same way as described in Example 1. Calcination, in an oxidizing atmosphere at about 1500° F., of the fused pig of complex, reduced zirconium product produced by the furnacing results in a granular, stabilized zirconia product of low-silica content.

As indicated in the preceding examples, the alkaline earth metal oxides, including magnesium oxide, employed in carrying out the process of the present invention may be used as such or as compounds thereof, for example the carbonates, which decompose under the conditions of the process to form the oxides. In such cases, there may be used relatively inexpensive compounds, for example, limestone instead of lime, magnesite instead of magnesia, or a dolomitic limestone where both lime and magnesia are desired. In any event, when an oxide of one of the above-mentioned group of metals is mentioned hereinafter, it is, except where otherwise indicated, intended to include other compounds of the metal which under the process conditions decompose to form the oxide of the metal.

Instead of calcining the complex reduced zirconium product in a muffle furnace to oxidize the zirconium cyanonitride therein, the calcination may be carried out, if desired, in other apparatus, for example, a rotary kiln with an oxidizing atmosphere. Although a calcination temperature of at least about 1500° F. is required, temperatures between about 1500° F. and 2200° F. are preferred. Higher calcination temperatures up to about 2800° F. can be employed, but there appears to be no overall advantage thereto. The time required for completion of the calcination will, of course, vary with the temperature used, being less at higher temperatures.

An alternative method of oxidizing the zirconium cyanonitride contained in the complex reduced zirconium product resulting from arc furnacing is illustrated in the following example:

*Example 8*

A pig of complex reduced zirconium product obtained by carrying out the arc furnacing operation of any of the preceding examples is cleaned of unreacted and semi-reacted material while it is still hot. It is then exposed while at a temperature above about 1500° F., on a grate, for example, to a current of air which oxidizes the zirconium cyanonitride network in the pig. The pig thereupon decrepitates, yielding a granular, low-slica, zirconia product which, depending on its composition, may or may not be stabilized. In some cases, calcination of the resulting product in the above-described manner may still be desirable because of incomplete oxidation of the cyanonitride, but such recalcination is facilitated because the granular material is easily handled and a relatively short calcination time is required.

As indicated by the mixes described above, the amount of carbon employed in carrying out the arc furnacing of the present process may vary. In the several mixes the carbon content of the coke used is in a ratio of from 1:2 to 1:4 with respect to the silica content of the zirconia ore used. If desired, the ratio of carbon to silica may be as high as 1:1 and as low as 1:6. In general, the higher ratios of carbon to silica are preferred for use with zirconium ores having relatively lower silica contents. While petroleum coke is a convenient and preferred source of carbon for carrying out the process, any other desired source of carbon which will not introduce deleterious impurities may be used.

The amount of alkaline earth metal oxide used and the particular oxide will depend on the degree or extent of stabilization, if any, desired in the granular zirconia product. It is, of course, recognized that to have a stabilized zirconia product that is satisfactory in use all of the zirconia particles in the product need not be stabilized, i.e. occur in cubic form. For most purposes, only about 70% of the zirconia need be cubic. This corresponds to about 6% of stabilizing agent in the product. To obtain this percentage a ratio of about 1:16 of stabilizing agent to zirconia in the mix is necessary. However, ratios as high as 1:5 may be used and ratios somewhat above 1:8 are usually chosen to allow for possible reduction and vaporization of a part of the stabilizing agent. When it is desired to carry out the process of the present invention to produce an unstabilized granular, low-silica zirconia product the ratio of alkaline earth metal oxide to zirconia in the furnace mix may be as low as about 1:60. If the occurrence of a significant amount of cubic zirconia in the product is to be prevented no more calcium oxide and/or magnesium oxide should be present in the mix than will result in less than about 2% of such oxides in the product after reduction and oxidation of the pig.

In carrying out the process of the present invention the rate at which the mix of zirconium ore, carbon and alkaline earth metal oxide is fed to the arc furnace after the furnace is started may vary. It has been found desirable, however, to adjust the feed rate to the power input to the furnace since, other things being equal, greater uniformity is thus achieved. In general, furnace feed rates expressed as pounds per hour per KW of from about 0.60 to 1.40 have been found satisfactory. As a practical matter, additions of mix to the furnace are made in smaller increments at more frequent intervals than an hour. If desired, even continuous feeding is practical.

Although the fused, substantially non-porous zirconia products resulting from the present process are granular, they may be milled or ground to any desired smaller particle size. Preferably, in such milling there is employed a mill lined with zirconia and using zirconia grinding media, such as balls, in order to minimize contamination of the product. While fine particles of the granular, low-silica zirconia products of the invention may be refired to form a sintered grog that can thereafter be crushed to any desired size for use, the coarser particles of the products resulting from oxidation of the pig, as described above, may also be used as grog satisfactorily. Either type of grog can be used in the manufacture of zirconia articles and bodies. As pointed out above, it has been found that although granular zirconia products obtained by oxidation of the pigs of complex, reduced zirconium product vary in particle size and particle size distribution, a majority of the particles thereof will pass a 4 mesh sieve and be held on a 100 mesh sieve.

The granular, stabilized, low-silica zirconia products resulting from the carrying out of the process of the present invention are very satisfactory in use. Typical analyses show in addition to $ZrO_2$, 2.0%–10.0% CaO and/or MgO, 0.0%–0.3% $Fe_2O_3$, 0.2%–0.6% $Al_2O_3$, 0.1%–0.4% $TiO_2$ and 0.4%–1.5% $SiO_2$. The degree or extent of stabilization of these products will, of course, vary with the amount of calcium oxide and/or magnesium oxide present. Although products in which substantially all of the zirconia is in cubic form can be obtained by the present novel process, for most purposes a lesser degree of stabilization is satisfactory. The granular, stabilized zirconia products of the present invention may be utilized in making refractory bodies and articles instead of zirconia, stabilized to an equivalent extent, which has been produced by previously known procedures.

This is shown in the following example which describes a typical procedure for forming crucibles from a granular stabilized zirconia product obtained by the present process.

*Example 9*

A mix consisting of:

Stabilized zirconia of Example 2 (600 grams milled
  to −325 mesh and 400 grams 60–100 mesh
  grog) _____grams__ 1000
Sodium pyrophosphate (2% aqueous solution)
  _____ml__ 20
Water _____ml__ 120 is prepared and slipcast in a porous plaster mold, the excess slip being drained out after a ⅛ inch wall has been formed in the mold. The crucible after removal from the mold is air dried and then fired to maturity at about 3000° F. in an essentially neutral or an oxidizing atmosphere. The crucibles thus obtained have a smooth surface and are mechanically strong. Tests of such crucibles have shown somewhat better resistance to thermal shock than similar crucibles made from stabilized zirconia produced by prior art methods.

It will be understood that various modifications can be made in the slip-casting procedure described above. Thus, for example, other or additional deflocculants may be employed and the ratios of fine particles and grog and the particle sizes thereof may be changed. It is obviously also possible, if desired, to modify the refractory portion of the mix by including additional unstabilized zirconia and/or other refractory materials or a calcium or magnesium compound to increase the degree of stabilization of the zirconia. Granular stabilized zirconia produced by the novel process of the present invention may also, of course, be formed into other types of refractory articles and may be used with other conventional ceramic ware forming processes such as ramming.

The unstabilized, granular, low-silica zirconia resulting, for example, from the process of Example 1 may be used quite satisfactory for manufacturing abrasives, insulation, setter material, fillers, ceramic colors, and the like. Typical unstabilized products show analyses which in addition to $ZrO_2$ include: alkaline earth metal oxides 0.1%–1.0%, 0.0%–0.3% $Fe_2O_3$, 0.2%–0.6% $Al_2O_3$, 0.1%–0.4% $TiO_2$, and 0.4%–1.5% $SiO_2$.

It will be evident from the foregoing that the present novel process produces useful, low-silica, substantially non-porous, granular zirconia products directly from zirconia ores. The process is less expensive and more convenient than those hitherto used, since in the prior processes the zirconia product is recovered as a pig which must be crushed and milled for use. The low-silica content of the present granular zirconia products permits their use in the making of super-refractories, as setter material for ceramic articles which are sensitive to silica, and for other purposes.

As is well known, zirconia normally contains about 2%–3% hafnium oxide derived from hafnium compounds with which the zirconium ores are associated in nature. Since the chemical properties and reactions of hafnium and zirconium are more nearly identical than those of any other two elements, the separation of the hafnia from the zirconia is a troublesome and expensive procedure that for almost all purposes is unnecessary. Consequently the hafnia content of zirconia is usually disregarded. In the present case, therefore, the terms "zirconia" or "zirconium oxide" are meant to refer to either hafnia-free zirconia or the normal hafnia-containing zirconia. Throughout the preceding description and in the accompanying claims the percentages specified or referred to are percentages by weight.

I claim:
1. A process for producing a fused, low-silica, substantially non-porous, granular, zirconia product which consists essentially of the steps:
   (a) forming a mixture of silica-containing zirconium ore, carbon, and an oxide of an alkaline earth metal, the carbon being present in said mixture in a ratio of from 1:6–1:1 with respect to the silica content of said ore and the alkaline earth metal oxide being present in said mixture in a ratio of about 1:60–1:5 with respect to the zirconia content of said ore,
   (b) heating said mixture to at least 4500° F. whereby to dissociate the zirconium silicate present, to vaporize the major portion of the silica present and to form a fused mass of a complex, reduced zirconium product,
   (c) cooling said mass to form a pig of a complex, reduced zirconium product which comprises a major amount of fused zirconia particles and a minor amount of zirconium cyanonitride, and
   (d) subjecting said pig of said complex product to oxidizing conditions while at a temperature of at least about 1500° F. whereby to oxidize zirconium cyanonitride present therein and to cause said product to disintegrate into a granular material comprising predominantly fused zirconia particles.
2. A process as set forth in claim 1 in which said ore is zircon.

3. A process as set forth in claim 2 in which the ratio of carbon to the silica content of said ore is from 1:4–1:2.

4. A process as set forth in claim 2 in which the ratio of alkaline earth metal oxide to the zirconia content of said ore is from 1:60–1:16.

5. A process for producing a fused, low silica, substantially non-porous, granular, stabilized zirconia which consists essentially of the steps:

(a) forming a mixture of silica-containing zirconium ore, carbon, and a stabilizing metal oxide selected from the group consisting of calcium oxide and magnesium oxide, the carbon being present in said mixture in a ratio of from 1:6–1:1 with respect to the silica content of said ore and the stabilizing metal oxide being present in said mixture in a ratio of about 1:16–1:5 with respect to the zirconia content of said ore, (b) heating said mixture to at least 4500° F. whereby to dissociate the zirconium silicate present, to vaporize the major portion of the silica present and formed, and to form a fused mass of a complex, reduced zirconium product, (c) cooling said mass to form a pig of a complex, reduced zirconium product which comprises a major amount of fused, stabilized zirconia particles and a minor amount of intermixed zirconium cyanonitride, and (d) subjecting said pig of said complex product to oxidizing conditions while at a temperature of at least about 1500° F. whereby to oxidize zirconium cyanonitride present therein and to cause said product to disintegrate into a granular material comprising predominantly fused, stabilized zirconia particles.

6. A process as set forth in claim 5 in which said ore is zircon.

7. A process as set forth in claim 5 in which said stabilizing metal oxide is calcium oxide.

8. A process as set forth in claim 7 in which said ore is zircon.

9. A process as set forth in claim 6 in which the ratio of carbon to the silica content of said ore is from 1:4–1:2.

10. A process as set forth in claim 5 in which the ratio of stabilizing metal oxide to the zirconia content of said ore is from 1:8–1:5.

References Cited in the file of this patent

UNITED STATES PATENTS

| | | |
|---|---|---|
| 2,270,527 | Kinzie et al. | Jan. 20, 1942 |
| 2,271,367 | Fulcher et al. | Jan. 27, 1942 |
| 2,624,097 | Kistler | Jan. 6, 1953 |
| 2,653,107 | Blumenthal | Sept. 22, 1953 |
| 2,656,278 | Ballard et al. | Oct. 20, 1953 |